Jan. 6, 1942.   W. T. BIRDSALL   2,269,174
DRY ICE STORAGE
Filed Nov. 4, 1937
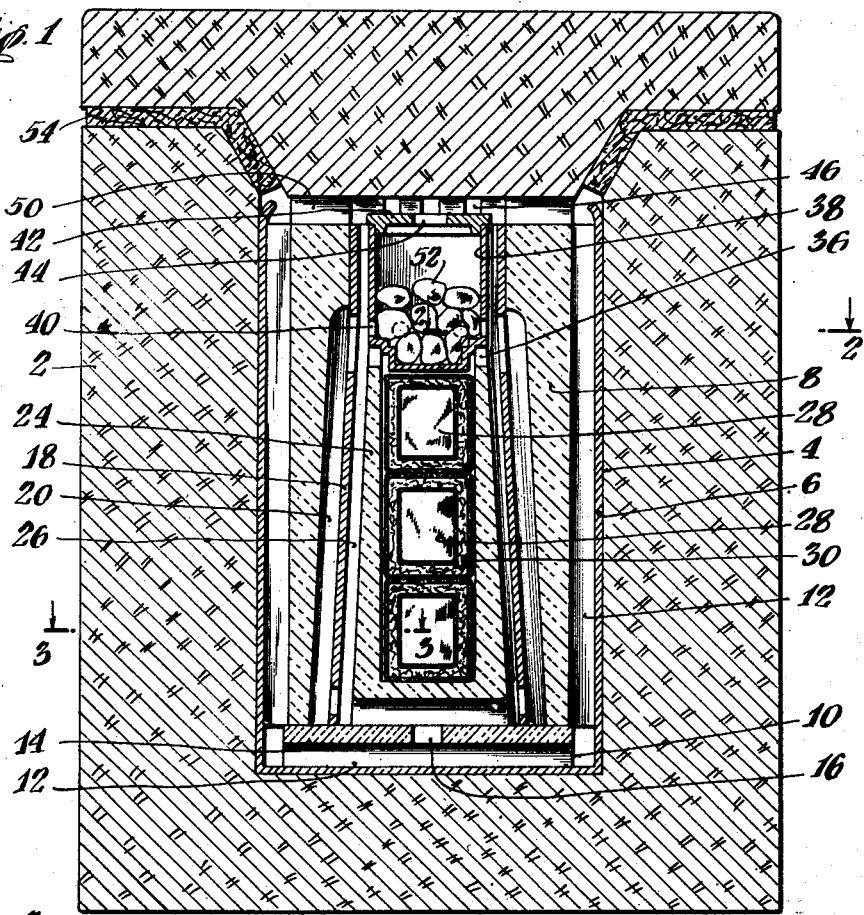
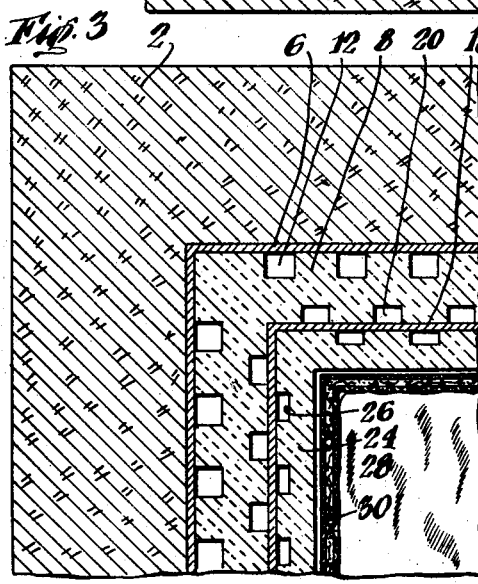
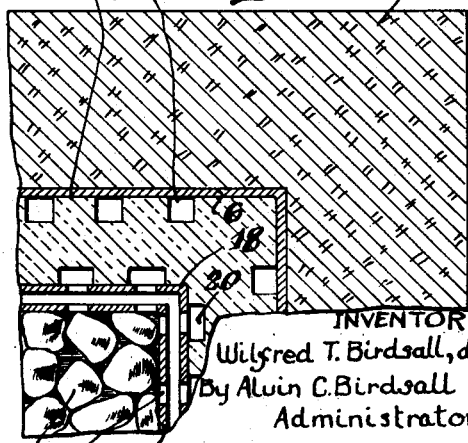
INVENTOR
Wilfred T. Birdsall, dec'd
By Alvin C. Birdsall
Administrator
BY
ATTORNEYS Patented Jan. 6, 1942

2,269,174

UNITED STATES PATENT OFFICE 2,269,174

DRY ICE STORAGE

Wilfred T. Birdsall, deceased, late of Montclair, N. J., by Alvin C. Birdsall, administrator, Washington, D. C., assignor to Mergenthaler Linotype Company, Brooklyn, N. Y., a corporation of New York Application November 4, 1937, Serial No. 172,717

6 Claims. (Cl. 62—91.5)

This invention relates to the preservation of low temperature refrigerants such as dry ice and particularly to methods and means for preventing or reducing transfer of heat to the stored material.

The storage of dry ice on a large scale or for long periods of time has heretofore been economically impractical due primarily to the very low temperature of the material and the difficulty in maintaining the requisite temperature difference between the stored material and the external atmosphere. The most effective devices now known to the industry for protecting dry ice from external heat serve only to reduce the loss by evaporation to from 5 to 10 per cent of the stored material per day. Such losses are obviously so great that storage for periods of weeks or months is impossible. Furthermore dry ice is usually manufactured and sold in the form of blocks of standard size and shape which on standing lose their regular shape so that when cut up into smaller pieces much of the block is wasted as scrap.

The means most commonly employed at the present time for protecting dry ice during shipping and storing are balsa-wood boxes of varying thickness. It has also been proposed to utilize the gas produced by evaporation of dry ice for cooling a refrigerated space but the problem in such cases has been to use only a small quantity of dry ice while maintaining the temperature of the space sufficiently low to prevent destruction or decay of fruit, fish, ice cream or the like.

In accordance with the present invention, it is possible to reduce the loss of stored dry ice to such an extent that it may be stored for long periods of time by establishing a heat absorbing zone which takes up and removes substantially all heat that penetrates the insulation about the zone. Then by insulating the storage chamber from the zone so produced it is possible to substantially eliminate all heat transfer to the material. The low temperature heat absorbing zone thus in effect constitutes the external atmosphere from which the stored material must be protected and since the temperature of the zone itself is substantially that of the stored material but very little heat penetrates to the storage space.

The heat absorbing zone may conveniently be produced and maintained by the use of scrap or broken dry ice whereby the heat loss is localized and the stored material preserved. Furthermore since the broken dry ice presents a relatively large surface and therefore evaporates much more rapidly than the stored material the gas produced and circulated about the insulated storage space may have a temperature even below that of the stored material. By this means it has been found possible to reduce the loss of the stored material to a small fraction of one per cent per day without substantially increasing the size or cost of the storage apparatus. The blocks retain their regularity of shape and firm structure so that losses occurring on cutting the blocks are greatly reduced.

One of the objects of the present invention is to provide new and improved means for preserving dry ice.

Another object of the invention is to preserve blocks of dry ice for long periods of time with substantially the form and structure that they possess when first produced.

A further object of the invention is to utilize broken or scrap dry ice in the preservation of blocks of dry ice being stored.

These and other objects and features of the invention will appear from the following description in which reference is made to the accompanying figures of the drawing which illustrate a typical form of mechanism adapted for use in the practice of applicant's invention.

In the drawing:

Figure 1 is a vertical sectional view of a representative form of apparatus for use in the storage of dry ice in accordance with applicant's invention.

Figure 2 is a horizontal sectional view taken on the line 2—2 of Figure 1, and

Figure 3 is a horizontal sectional view taken on the line 3—3 of Figure 1.

In that form of the invention chosen for purposes of illustration in the figures of the drawing, a storage receptacle designed to receive a small number of blocks of dry ice is shown, but it should be understood that the invention is equally applicable to the storage of large quantities of the material. The storage chamber shown comprises an outer casing 2 suitably insulated with balsa-wood, cork, or other insulating material and provided with a cavity 4 which may be lined with metal 6 if desired to provide a surface of substantially uniform temperature throughout. Within the cavity 4 is located a sleeve 8 which preferably is formed of insulating material and is supported in spaced relation to the bottom of the cavity by supports 10 so as to provide a channel 12 extending about the bottom and sides of the sleeve between the sleeve and the liner 6. The sleeve 8 rests on a support 14 having a central opening 16 to provide a passage for the flow of gas from the interior of the sleeve to the channel 12 extending about the bottom and sides of the sleeve.

Within the sleeve is located a separator 18 forming a channel 20 between the separator and the inner wall of the sleeve through which gas descending in the channel 20 may pass to the opening 16 and thence to the channel 12 about the exterior of the sleeve.

A heat insulating storage chamber 24 for receiving the blocks of dry ice to be stored is located within the sleeve 8 and is provided with channels 26 in its outer surface which are separated from the channels 20 by the separator 18. The channels 26 and 20 join at the bottom of the receptacle so that gas from both channels passes beneath the storage chamber to the opening 16.

Blocks of dry ice 28 being stored are placed within the storage chamber and preferably are enclosed within permeable insulating covers 30 in the form of felt-lined jackets fitting closely about the blocks of dry ice. Such covers or jackets are described more fully in applicant's copending application, Serial No. 172,714, filed Nov. 4, 1937, wherein applicant has pointed out the function thereof in reducing or retarding diffusion of gas from the solid. Any number of blocks may be positioned within the storage chamber and they may be arranged as desired in order to store as much material as possible in a small space and avoid creating convection currents about the stored material. As shown the inner walls of the storage chamber are formed with channels 34 shown in Figure 3, to provide passages for the flow of gas from the stored material into the channel 26 about the exterior of the recepticle. The upper edge of the chamber is formed with openings 36 to provide communication between the passages 34 and the channels 26.

In order to preserve the stored dry ice by localizing the absorption of heat from external sources and by providing a low temperature heat absorbing zone, the device is provided with a receptacle 38 positioned above the storage chamber 24 and formed to close the upper end thereof, leaving only the openings 36 for the escape of what little gas may evaporate from the stored material. The receptacle 38 is charged with broken or scrap dry ice or with other suitable low temperature material and is formed with openings 40 in the lower portion thereof communicating with the channels 20 which extend downwardly about the exterior of the separator 18. A cover 42 is provided for the receptacle and is formed with an opening 44 in the center thereof communicating with the space 46 between the cover 42 for the receptacle and the cover 48 for the casing 2. The channels 12 which extend upwardly about the sides of the sleeve 8 communicate with the space 46 through openings 50 about the upper edge of the sleeve 8 so that gas flowing upwardly through the channels 12 passes into the space 46 and through the central opening 44 in the cover 42 into contact with the broken dry ice 52 within the receptacle. The gas is thus cooled by evaporation of the broken dry ice and flows downward through and over the same giving up all heat penetrating the insulating casing 2 to the dry ice in the receptacle. The cold heavy gas then passes outwardly through the openings 40 in the lower portion of the receptacle into the channels 20 flowing downwardly within the sleeve 8 about the separator 18 and beneath the storage chamber 24 to the opening 16 in the support 14 for the sleeve. Thence the gas flows outwardly to the channels 12 and upwardly again to the space 46 completing the circuit.

As shown in Figures 2 and 3 the downwardly extending channels 20 and the upwardly extending channels 12 may be arranged in staggered relation to provide the maximum cooling and absorption of heat from the sleeve 8. In this way transfer of heat by conduction through the insulating sleeve 8 from channels 12 to the channels 20 is reduced to a minimum and the inner surface of the sleeve is maintained at a temperature approaching that of the cold gas circulating downwardly over the same. Transfer of heat from the sleeve to the downwardly flowing gas is thus negligible and the heat absorbing zone produced is itself at a temperature substantially as low or even lower than that of the stored material.

As shown in the drawing the sleeve 8 is of greater thickness adjacent the top thereof than near the bottom whereas the storage chamber 24 is thicker adjacent the bottom than at the top. This construction is desirable in many instances, due to the fact that the evaporating broken dry ice cools the adjacent blocks of stored material to a greater extent than the circulating gas passing downwardly through the channels 20 and 26. The lower portion of the chamber 24 is thus provided with the maximum heat insulation through that portion thereof subjected to the highest external temperature. The receptacle 38 within which the broken dry ice is maintained is also provided with additional insulation about the top thereof by thickening the top of sleeve 8 to compensate for the absence of downwardly circulating cold gas about the same.

In using the construction described, the blocks of dry ice to be stored are placed in the pervious jackets 30 and introduced into the storage chamber 24 to substantially fill the same, the blocks being arranged in any desired manner to facilitate their removal and to avoid the creation of convection currents within the receptacle itself. The receptacle 38 is then placed above the storage chamber 24 to substantially close the same and is charged with broken dry ice or any other suitable refrigerant. The cover 42 of the receptacle 38 is located in place and the cover 48 for the casing 2 is applied. Ordinarily a pervious insulating packing 54 is located between the cover and the casing to permit the escape of carbon dioxide gas produced while preventing transfer of heat or the admission of air to the material through the space thus created. The cover 48 may be removed from time to time as necessary to renew the charge of broken dry ice within the receptacle 38.

The creation of the currents of gas through the channels 20 and 12 takes place automatically and varies with the rate of circulation and evaporation of broken dry ice. This variation occurs in response to the rate of heat transfer through the walls of the casing 2. Therefore a heat absorbing zone is established about the storage chamber which is continuously and automatically maintained at or below the temperature of the stored material itself. The supply of cold gas is continuously renewed and that portion thereof passing over the surface of the storage chamber within which the material is located is at the lowest temperature produced in the apparatus. Furthermore the low temperature zone itself is insulated from external heat by the upwardly flowing current of gas in the channels 12 and by the insulating sleeve 8. All heat absorbed by the gas during its circulation is extracted therefrom by its passage through the receptacle 38 from the central opening 44 to the outlets 40 whereby it gives up its heat to the broken dry ice as latent heat of vaporization and does not convey heat to the storage chamber. The zone produced by the channels 20 thus reduces the difference in temperature between the interior and exterior of the storage receptacle to a negligible difference with the result that only a relatively small temperature difference need be maintained between the interior and exterior of the storage chamber to effectively preserve the material. Heat absorption is thus confined to the broken dry ice and the material in the chamber 24 may be stored for long periods of time without substantial loss thereof.

While the invention has been illustrated as applied to a small portable unit capable of being easily transported the principle of the invention may be applied with equal success to large installations wherein thousands of pounds of the material are stored. The material may thus be preserved for periods of weeks or months without substantial loss. It should therefore be understood that it is not intended that the invention be limited to the particular construction herein shown and described except as defined by the claims.

What is claimed is:

1. The method of storing dry ice which comprises the steps of enclosing a store of dry ice in a permeable insulating jacket, placing the jacket containing the store of dry ice in an insulated chamber contained within and spaced from a second insulated chamber, establishing a heat absorbing zone in the space between said chambers, and maintaining said zone at a temperature approaching that of dry ice.

2. The method of storing dry ice which comprises the steps of enclosing a store of dry ice in a permeable insulating jacket, placing the jacket containing the dry ice in an insulated chamber positioned within and spaced from a second insulated chamber, and creating a heat absorbing zone in the space between said chambers by evaporation of additional dry ice.

3. The method of storing dry ice which comprises the steps of establishing a store of dry ice within an insulated casing, locating additional dry ice above said stored dry ice and within said casing, and circulating cold carbon dioxide gas produced by evaporation of said additional dry ice downwardly about and beneath said stored dry ice.

4. The method of storing dry ice which comprises the steps of establishing a store of dry ice within an insulated storage chamber, locating additional dry ice above the stored dry ice and outside of said chamber, and circulating cold carbon dioxide gas resulting from evaporation of said additional dry ice in a circuit downwardly about the storage chamber and thence upwardly about said downwardly flowing gas into contact with said additional dry ice.

5. Apparatus for the storage of dry ice comprising an insulated casing, a storage chamber for receiving dry ice located within said casing, a receptacle for receiving dry ice located within said casing and above said storage chamber, and means communicating with the lower portion of said receptacle for conducting carbon dioxide gas produced by evaporation of said additional dry ice downwardly about the sides and beneath the bottom of said storage chamber and other means communicating with the upper portion of said receptacle and located between said first mentioned means and the casing for conducting carbon dioxide gas upward from said first mentioned means to said receptacle.

6. Apparatus for the storage of dry ice comprising an insulated chamber, blocks of dry ice to be stored, enclosed in previous heat insulating material located in said chamber, a receptacle for receiving additional dry ice located above said storage chamber and provided with upper and lower openings, conduits having portions extending downwardly from a lower opening in said receptacle about the sides of the storage chamber and beneath the same and having other portions extending upwardly to an upper opening in said receptacle externally of the downwardly extending portions thereof, and a heat insulating casing enclosing said storage chamber, receptacle and conduits.

ALVIN C. BIRDSALL,
*Administrator of the Estate of Wilfred T. Birdsall, Deceased.*